Oct. 31, 1939. P. S. BLOOM Re. 21,253

UNDERGARMENT

Original Filed June 22, 1936

Inventor
PHILIP S. BLOOM.

by Charles H. Field Atty.

Reissued Oct. 31, 1939

Re. 21,253

UNITED STATES PATENT OFFICE 21,253

UNDERGARMENT

Philip S. Bloom, Chicago, Ill.

Original No. 2,064,409, dated December 15, 1936, Serial No. 86,480, June 22, 1936. Application for reissue December 15, 1938, Serial No. 245,950

4 Claims. (Cl. 2—73)

The present invention relates to a lady's combination undergarment free from hooks and eyes, snap fasteners, buttons and the like, and more particularly to a combination lower body garment and an upper body garment such as a brassière slip, wherein the back of the lower garment section or slip portion is provided with an extension which extends upwardly above the upper edge of the slip portion and forms the back section of the upper garment section or brassière. The combination garment produces an arrangement whereby a single band of elastic secured to the upper margin of the back extension of the lower garment section has the ends thereof connected with the upper rear corners of the upper garment section to afford a combination undergarment wherein the single strip of elastic serves both as a means for resiliently drawing the upper garment section or brassière around the bust of a wearer and also draws the front and sides of the lower garment section or slip around the body of a wearer, thereby grouping any fullness of the garment sections in the back of the garment, causing the front and the sides to form-fit the wearer of the combination undergarment.

It is an object of this invention to provide a combination ladies' undergarment wherein an upper section, such as a brassière, is secured to the upper end of a lower section, such, for example, as a slip with the rear upper extension of the back of the slip forming the back of the brassière and terminating in an elastic hem which serves as a common means for making the front and the sides of both the brassière and the slip form-fitting by concentrating the fullness of the garment in the middle portion of the back of the slip.

It is an important object of this invention to provide an improved ladies' combination undergarment, such as stepins, brassière chemise, brassière panties or bloomers, or more particularly a brassière slip, in which the back of the slip is provided with an extension, the sides of which are secured to the rear ends of the sides of the brassière to form a brassière back provided on its upper margin with an elastic extending across the upper portion of the back of the combination undergarment to improve the form-fitting qualities of the garment by concentrating any fullness of the undergarment in the middle of the back.

Other and further important objects of this invention will be apparent from the disclosures in the specification and the accompanying drawing.

The invention (in preferred forms) is illustrated in the drawing, and hereinafter more fully described.

Figure 1:
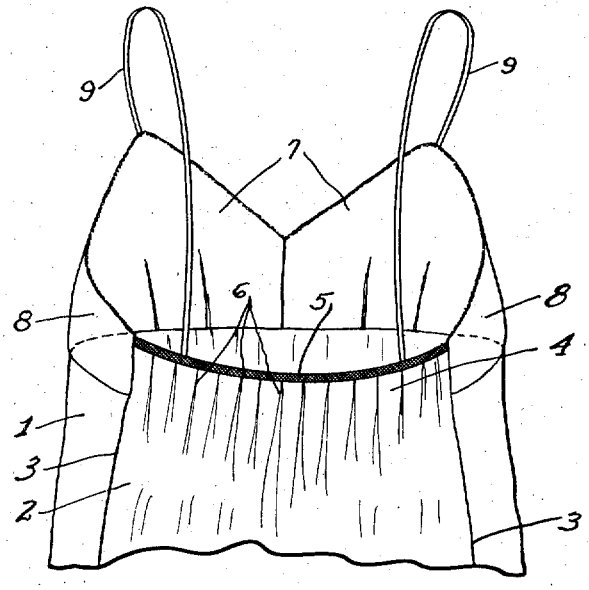
Figure 1 illustrates a fragmentary back perspective view of the upper portion of one of the forms of an improved combination undergarment embodying the features of this invention.

In the form of the combination undergarment illustrated in Figure 1, a brassière slip is shown. The slip portion comprises a front panel 1 and a rear panel 2, with the front panel being wider than the rear panel and extending around the sides of the garment to connect up with the rear panel along the seams 3. The rear panel 2 extends upwardly above the top margin or edge of the front or body panel 1 to form an extension 4, across the upper margin of which an elastic band or strap 5 is sewed or secured, which holds the upper margin of the extension 4 shirred or formed with plaits or gathers 6.

Sewed or otherwise secured to the upper edge of the front panel 1 of the slip is a brassière which is constructed of two breast portions 7, each of which is provided with a side extension 8 which extends around one side of the garment and has the end margin thereof secured by stitching or other suitable means to one side of the back extension 4 of the rear panel 2 of the slip. The ends of the elastic strap 5 are secured to the upper corners of the side extensions 8 of the brassière sections 7.

As clearly illustrated in Figure 1, it will be noted that the extension 4 of the back panel 2 of the slip forms the back of the brassière, and the elastic strap 5 performs the double purpose of holding the upper margin of the back panel shirred or gathered, and furthermore acts to cause the brassière as well as the slip to be drawn to form-fit around the body of a person wearing the garment.

Attached to the upper margins of the front sections 7 of the brassière are the front ends of a pair of shoulder straps 9, the rear ends of which are attached to the upper margin of the rear portion of the garment.

If preferred, the brassière, of course, can be made of a one-piece construction extending across the front of the garment and around the sides to connect with the sides of the upper extension 4 of the back panel 2 of the slip. Attention is particularly called to the fact that, in this improved type of garment, only one elastic strap is necessary for both the upper and lower sections of the garment, such as the brassière and the slip, and that the upper extension 4 of the rear panel 2 of the slip also serves as a shirred, plaited or gathered back for the brassière.

Figure 2:
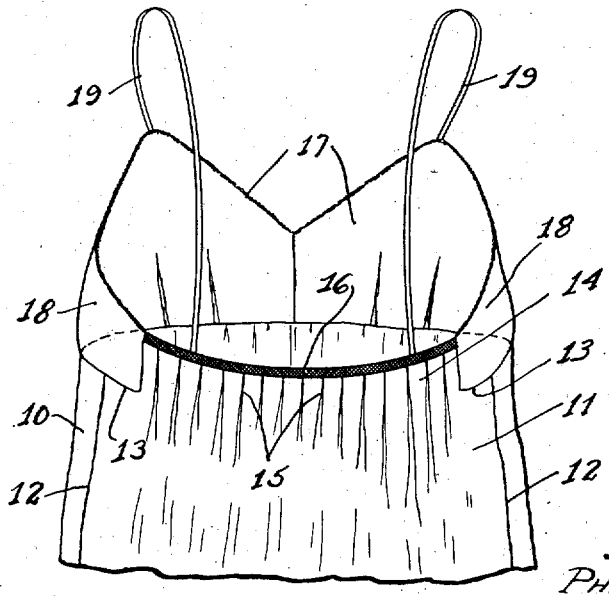
Figure 2 is a fragmentary rear perspective view of the upper portion of a modified form of combination undergarment.

Figure 2 illustrates a modified form of combination undergarment consisting of a slip having a brassière secured to the upper margin thereof, with a portion of the slip forming a back for the brassière. In this modified form of the device, the reference numeral 10 indicates a front slip panel which extends part way around the sides of the garment and is secured to the side margins of a rear panel 11 along the seams 12. The middle portion of the upper margin of the back panel 11 extends upwardly above the top edge of the front panel 10 and above the edges 13 formed at both sides of the top part of the rear panel 11 beyond the sides of the extension 14. The upper margin of the back extension 14 may be plaited, shirred or gathered at 15 by means of an elastic band or strap 16 sewed or otherwise secured across the upper edge of the back extension 14.

The brassière section of the undergarment comprises a pair of breast sections 17 which extend across the front of the garment, with each of the breast sections having a side extension 18 which extends around the side of the garment and has the lower edge thereof stitched or otherwise secured to the top edge of the side portions of the front panel 10 of the slip and to the edges 13 of the rear slip panel 11. The ends of the brassière side sections 18 are sewed or otherwise secured to the side edges of the rear panel extension 14. The ends of the elastic strap 16 are secured to the upper rear corners of the brassière side sections 18. Connected to the upper edges of the brassière sections 17 are the front ends of a pair of shoulder straps 19, the rear ends of which are secured to the back of the garment.

The improved combination undergarment, while being described as a brassière slip, may, if so desired, take the form of stepins, a brassière chemise, brassière panties, brassière bloomers or the like, with all of said various types of undergarments having an extension of the back portion of the lower section of the garment projecting upwardly to form the back of the upper section of the combination undergarment.

It will, of course, be understood that various details of construction may be varied through a wide range without departing from the principles of this invention, and it is therefore not the purpose to limit the patent granted hereon otherwise than is necessitated by the scope of the appended claims.

I claim as my invention:

1. A combination undergarment comprising a slip section, a brassière section circumferentially seamed to the upper end of the slip section and extending around the front and the sides of the undergarment, an extension formed on the upper end of the back portion of the slip and extending upwardly between the side portions of the brassière and secured thereto to form a back for the brassière, and an elastic member secured across the upper margin of the extension on the back portion of the slip to hold said extension shirred, said elastic member having the ends thereof secured to the ends of the side portions of the brassière and offset vertically above the circumferentially extending seam.

2. A combination undergarment comprising a lower garment consisting of a front panel and a rear panel, said rear panel having an extension extending upwardly above the upper margin of the front panel, an elastic member secured across the upper margin of the rear panel extension, a brassière consisting of breast sections and side extensions with the breast sections and side extensions secured to the upper margin of the front panel of the lower garment, said brassière having the ends of the side portions thereof secured to the side margins of the rear panel extension and to the ends of the elastic member.

3. A combination undergarment comprising an upper portion formed to define a brassière having breast sections and side extensions, the rearwardly extending ends of said side extensions being spaced apart to define an opening between their rear terminal edges, a lower garment depending from said brassière and having a rear panel portion extending upwardly between the rear terminal edges of the brassière and secured thereto to form a back for the brassière, and an elastic member secured to the upper edge of the panel extension and to the adjacent upper side margins of the brassière side extensions, whereby the panel extension forming the back of the brassière is shirred.

4. A combination undergarment comprising an upper garment part formed into a brassière having breast sections and side extensions provided adjacent the bottom of the brassière with rearwardly extending ends spaced apart to define an opening between their rear extremities, a lower garment part depending from said brassière and having a rear portion extending upwardly between said side extensions and secured to said ends of the brassière, and elastic means in said opening at the top of said rear portion of the lower garment part and being secured to an upper end of said rear portion between said ends of said brassière to form an elastic back for the brassière and connected to said rear extremities of the brassière to draw said ends toward each other adjacent the bottom of the brassière and to thus shape and fit said brassière thereabove to the breasts of the wearer, said rear portions depending therefrom and having a draped and loose fit on the body of the wearer.

PHILIP S. BLOOM.